US012073779B2

(12) United States Patent
Chun et al.

(10) Patent No.: US 12,073,779 B2
(45) Date of Patent: Aug. 27, 2024

(54) DISPLAY DEVICE WHICH GRADUALLY CHANGES DISPLAY DRIVING FREQUENCY TO REDUCE SCREEN ABNORMALITIES

(71) Applicant: LG ELECTRONICS INC., Seoul (KR)

(72) Inventors: Youngho Chun, Seoul (KR); Byungwoo Ryu, Seoul (KR); Hyungil Lee, Seoul (KR); Joonduk Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/594,153

(22) PCT Filed: May 31, 2019

(86) PCT No.: PCT/KR2019/006593
§ 371 (c)(1),
(2) Date: Oct. 4, 2021

(87) PCT Pub. No.: WO2020/241946
PCT Pub. Date: Dec. 3, 2020

(65) Prior Publication Data
US 2022/0199006 A1 Jun. 23, 2022

(51) Int. Cl.
*G09G 3/3208* (2016.01)

(52) U.S. Cl.
CPC ..... *G09G 3/3208* (2013.01); *G09G 2310/061* (2013.01); *G09G 2310/08* (2013.01); *G09G 2320/0252* (2013.01)

(58) Field of Classification Search
None
See application file for complete search history.

(56) References Cited

U.S. PATENT DOCUMENTS 8,299,985 B2 * 10/2012 Shin .................... G09G 3/3208 345/212
2003/0020699 A1 1/2003 Nakatani et al.
(Continued)

FOREIGN PATENT DOCUMENTS

KR 1020060018393 3/2006
KR 1020080040281 5/2008
(Continued)

OTHER PUBLICATIONS

PCT International Application No. PCT/KR2019/006593, International Search Report dated Feb. 27, 2020, 10 pages.
(Continued)

*Primary Examiner* — Benjamin C Lee
*Assistant Examiner* — Emily J Frank
(74) *Attorney, Agent, or Firm* — LEE, HONG, DEGERMAN, KANG & WAIMEY

(57) ABSTRACT

The present specification discloses a display device which, upon consecutive viewing of images of different frequencies, may improve abnormalities on a screen according to frequency change, and a method for controlling same. A digital device, according to one embodiment of the present invention, comprises: a processor; a display unit comprising a plurality of pixels; and a timing controller for temporally controlling a driving frequency such that the display device is driven, wherein the timing controller controls a light-emitting signal at a preset duty ratio in one frame interval, and when the display unit displays an image of a first input frequency and thereafter displays an image of a second input frequency, a value of a vertical blanking interval for each frame interval gradually changes.

11 Claims, 10 Drawing Sheets

(56) References Cited

U.S. PATENT DOCUMENTS

| | | | | |
|---|---|---|---|---|
| 2015/0310814 | A1 | 10/2015 | Umekida et al. | |
| 2015/0379665 | A1 | 12/2015 | Kwa et al. | |
| 2016/0035297 | A1* | 2/2016 | Oh | G09G 3/3618 345/94 |
| 2018/0068610 | A1* | 3/2018 | Cho | G09G 3/32 |
| 2018/0268761 | A1* | 9/2018 | Kuo | G09G 3/34 |
| 2019/0057633 | A1* | 2/2019 | Li | G09G 3/3258 |
| 2020/0211471 | A1* | 7/2020 | Park | G09G 3/3233 |
| 2020/0302893 | A1* | 9/2020 | Lin | G09G 5/10 |
| 2020/0349893 | A1* | 11/2020 | Lee | G09G 3/3233 |
| 2022/0019332 | A1* | 1/2022 | Ko | G06F 1/3206 |
| 2022/0208066 | A1* | 6/2022 | Kikuchi | H01L 51/50 |

FOREIGN PATENT DOCUMENTS

| | | |
|---|---|---|
| KR | 1020130018493 | 2/2013 |
| KR | 10-2018-0018939 | 2/2018 |
| KR | 10-2018-0058279 | 6/2018 |
| KR | 10-2018-0059017 | 6/2018 |
| KR | 10-2019-0140760 | 12/2019 |

OTHER PUBLICATIONS

European Patent Office Application Serial No. 19930370.2, Search Report dated Oct. 25, 2022, 12 pages.

Korean Intellectual Property Office Application No. 10-2021-7030903, Office Action dated Aug. 22, 2023, 6 pages.

Korea Patent Office Application No. 10-2021-7030903, Office Action dated Dec. 19, 2023, 7 pages.

* cited by examiner (a)

FIG. 6

(unit : H)

| | driving frequency | 100Hz | 120Hz |
|---|---|---|---|
| Vertical | Display Period | 2160 | 2160 |
| | Blank | 540 | 90 |
| | Total | 2700 | 2250 |
| Horizontal | Display Period | 240 | 240 |
| | Blank | 35 | 35 |
| | Total | 275 | 275 |

FIG. 7

| Change of V blank value per frame by 5H | | |
|---|---|---|
| V blank | V blank / V total | Change |
| 540 | 24.00% | 0.22% |
| 535 | 23.78% | 0.22% |
| 530 | 23.56% | 0.22% |
| 525 | 23.33% | 0.22% |
| 520 | 23.11% | 0.22% |
| 515 | 22.89% | 0.22% |
| 510 | 22.67% | 0.22% |
| 505 | 22.44% | 0.22% |
| 500 | 22.22% | 0.22% |
| 495 | 22.00% | 0.22% |
| 490 | 21.78% | 0.22% |
| 485 | 21.56% | 0.22% |
| 480 | 21.33% | 0.22% |
| | | |
| | | |
| | | |
| 150 | 6.67% | 0.22% |
| 145 | 6.44% | 0.22% |
| 140 | 6.22% | 0.22% |
| 135 | 6.00% | 0.22% |
| 130 | 5.78% | 0.22% |
| 125 | 5.56% | 0.22% |
| 120 | 5.33% | 0.22% |
| 115 | 5.11% | 0.22% |
| 110 | 4.89% | 0.22% |
| 105 | 4.67% | 0.22% |
| 100 | 4.44% | 0.22% |
| 95 | 4.22% | 0.22% |
| 90 | 4.00% | 0.22% |

(a)

| Change of V blank value per frame by 10H | | |
|---|---|---|
| V blank | V blank / V total | Change |
| 540 | 24.00% | 0.44% |
| 530 | 23.56% | 0.44% |
| 520 | 23.11% | 0.44% |
| 510 | 22.67% | 0.44% |
| 500 | 22.22% | 0.44% |
| 490 | 21.78% | 0.44% |
| 480 | 21.33% | 0.44% |
| 470 | 20.89% | 0.44% |
| 460 | 20.44% | 0.44% |
| 450 | 20.00% | 0.44% |
| 440 | 19.56% | 0.44% |
| 430 | 19.11% | 0.44% |
| 420 | 18.67% | 0.44% |
| | | |
| | | |
| | | |
| 150 | 6.67% | 0.44% |
| 140 | 6.22% | 0.44% |
| 130 | 5.78% | 0.44% |
| 120 | 5.33% | 0.44% |
| 110 | 4.89% | 0.44% |
| 100 | 4.44% | 0.44% |
| 90 | 4.00% | 0.44% |

(b)

| Change of V blank value per frame by 20H | | |
|---|---|---|
| V blank | V blank / V total | Change |
| 540 | 24.00% | 0.89% |
| 520 | 23.11% | 0.89% |
| 500 | 22.22% | 0.89% |
| 480 | 21.33% | 0.89% |
| 460 | 20.44% | 0.89% |
| 440 | 19.56% | 0.89% |
| 420 | 18.67% | 0.89% |
| 400 | 17.78% | 0.89% |
| 380 | 16.89% | 0.89% |
| 360 | 16.00% | 0.89% |
| 340 | 15.11% | 0.89% |
| 320 | 14.22% | 0.89% |
| 300 | 13.33% | 0.89% |
| | | |
| | | |
| | | |
| 150 | 6.67% | 0.89% |
| 130 | 5.78% | 0.89% |
| 110 | 4.89% | 0.89% |
| 90 | 4.00% | 0.89% |

(c)

FIG. 8

| Condition | Second input frequency | Second driving frequency | Amount by which V blank value changes (example) |
|---|---|---|---|
| (a) | <25Hz><br>A B | <100Hz><br>A A A A B B B B | By 20 H |
| (b) | <24Hz><br>A B | <120Hz><br>A A A A A B B B B B | |
| (c) | <50Hz><br>A B C D | <100Hz><br>A A B B C C D D | By 10 H |
| (d) | <60Hz><br>A B C D E | <120Hz><br>A A B B C C D D E E | |

DISPLAY DEVICE WHICH GRADUALLY CHANGES DISPLAY DRIVING FREQUENCY TO REDUCE SCREEN ABNORMALITIES

CROSS-REFERENCE TO RELATED APPLICATIONS

This application is the National Stage filing under 35 U.S.C. 371 of International Application No. PCT/KR2019/006593, filed on May 31, 2019, the contents of which are all incorporated by reference herein in its entirety.

TECHNICAL FIELD

The present disclosure relates to a display device that displays an image and a method for controlling the same. More specifically, the present disclosure relates to a display device capable of improving an abnormality phenomenon of a screen due to a change in frequency, for example, when a viewer is continuously viewing images of different frequencies, and a method for controlling the same.

Background Art

As the information society develops, various demands for a display device for displaying an image are increasing. Thus, a liquid crystal display device (LCD), a plasma display device (PDP), and an organic light emitting diode display device (OLED) are widely used as the display device. Further, recently, a micro light-emitting diode display device (Micro-LED) that renders a color using a micro light-emitting diode on a pixel basis is presented.

An organic light-emitting diode (OLED) includes an anode electrode and a cathode electrode, and an organic compound layer formed therebetween. The organic compound layer is composed of a hole transport layer (HTL), a light emission layer (EML), and an electron transport layer (ETL). When a driving voltage is applied to the anode electrode and the cathode electrode, holes passing through the hole transport layer (HTL) and electrons passing through the electron transport layer (ETL) move to the emission layer (EML) in which excitons are produced, and as a result, the emission layer (EML) generates visible light.

The micro light-emitting diode (Micro-LED) acts as a light-emitting element with a size of several tens of micrometers and has a heterojunction structure of a p-type semiconductor in which holes are majority carriers and an n-type semiconductor in which electrons are majority carriers. Majority carriers of the different types move in opposite directions due to applied voltage and thus meet and recombine with each other in an active layer and release excitation energy thereof in a form of photons. At this time, a wavelength of the photon may be based on a unique energy gap of the active layer. Unlike the organic light-emitting diode, the micro light-emitting diode (Micro-LED) is based on an inorganic material, and thus may minimize glare phenomenon of a display screen, and have excellent advantages in terms of power consumption and lifespan characteristics.

Further, in the display device using the organic light-emitting diode (OLED) or the display device using the micro light-emitting diode (Micro-LED), each of pixels and sub-pixels may be composed of an individual diode. Thus, the display device may be easily implemented as an active matrix type display device. Further, due to self-luminous characteristics thereof, the device has a fast response speed, high light-emitting efficiency, high luminance, and a large viewing angle.

However, in order to reproduce an image of high driving frequency naturally, a short motion picture response time (MPRT) is required.

The motion picture response time is evaluated based on a measuring result of movement of a moving image displayed on the screen of the display device. To this end, an international standard of evaluating the MPRT includes capturing the images as still images along a boundary of the motion picture based on human visual characteristics for an appropriate time using a CCD camera, and evaluating a sharpness of the captured still images.

That is, when an index of the motion picture response time is smaller, this may mean that a sharpness of the image is low, which means that the user's eye fatigue increases when the user views the motion picture displayed on the display device.

Recently, in order to improve the index of the motion picture response time, various schemes including BFI (Black Frame Insertion) in which a black frame is inserted between reproduced image frames are being introduced.

DISCLOSURE

Technical Problem

A purpose of an embodiment of the present disclosure is to reduce a screen abnormality phenomenon that occurs when images of different driving frequencies are continuously reproduced on a display device.

Further, a purpose of another embodiment of the present disclosure is to provide a display device to which a scheme of controlling a duty ratio of a light emission signal within one frame to achieve black data insertion effect is applied, in which a screen abnormality phenomenon that occurs when images of different driving frequencies are continuously reproduced is reduced.

Technical Solutions

A method for controlling a display device to achieve the purpose includes converting a first input frequency to a first driving frequency; when the device operates at the first driving frequency, controlling a signal based on a value of a first vertical blank interval set for the first driving frequency regardless of a time point; converting a second input frequency different from the first input frequency into a second driving frequency; when the device operates at the second driving frequency, controlling, at a first time point, the signal based on a value of a third vertical blank interval different from the value of the first vertical blank interval set for the first driving frequency and a value of a second vertical blank interval set for the second driving frequency; and at a second time point after the first time point, controlling the signal based on the value of the second vertical blank interval set for the second driving frequency.

In one embodiment of the method, the method comprises, when the device operates at the first driving frequency and the second driving frequency, controlling a light emission signal based on a preset duty ratio within one frame interval.

In one embodiment of the method, controlling the signal based on the value of the third vertical blank interval includes gradually changing the value of the third vertical blank interval.

In one embodiment of the method, gradually changing the value of the third vertical blank interval includes sequentially changing the value of the third vertical blank interval by a constant amount and between the value of the first vertical blank interval set for the first driving frequency and the value of the second vertical blank interval set for the second driving frequency.

In one embodiment of the method, the method comprises, when converting the second input frequency to the second driving frequency, determining the constant amount based on a difference between the second input frequency and the second driving frequency.

In one embodiment of the method, one of the first driving frequency and the second driving frequency is 100 Hz and the other thereof is 120 Hz.

A display device to achieve the purpose includes a processor; a display including a plurality of pixels; and a timing controller configured to temporally control a driving frequency to operate the display, wherein the timing controller is configured to: control a light emission signal based on a preset duty ratio within one frame interval; and when the display displays an image of a first input frequency and then an image of a second input frequency, gradually change a value of a vertical blank interval for each frame interval.

Advantageous Effects

According to one embodiment of the various embodiments of the present disclosure, the display device has an effect of reducing the screen abnormality that occurs when images of different driving frequencies are continuously reproduced.

According to another embodiment of the various embodiments of the present disclosure, in a display device to which a scheme of controlling a duty ratio of a light emission signal within one frame to achieve black data insertion effect is applied, a screen abnormality phenomenon that occurs when images of different driving frequencies are continuously reproduced is reduced.

According to another embodiment of the various embodiments of the present disclosure, when the image of the input frequency is converted to the image of the driving frequency, the display device changes the value of the vertical blank interval based on the difference between the input frequency and the driving frequency, thereby minimizing the screen abnormality that occurs when images of different driving frequencies are continuously reproduced.

DESCRIPTION OF DRAWINGS

FIG. 6 is a diagram showing information on a vertical scan interval and a horizontal scan interval set based on a driving frequency.

FIG. 7 is a diagram showing a ratio of a value of a vertical blank interval relative to a total vertical scan time within one frame and a difference between the ratios for adjacent frames when an amount by which the value of the vertical blank interval changes on a frame basis varies.

FIG. 8 is a diagram of the vertical blank interval value that changes on a frame basis, based on a difference between the input frequency and the driving frequency when the input frequency is converted to the driving frequency.

BEST MODE

Figure 1:
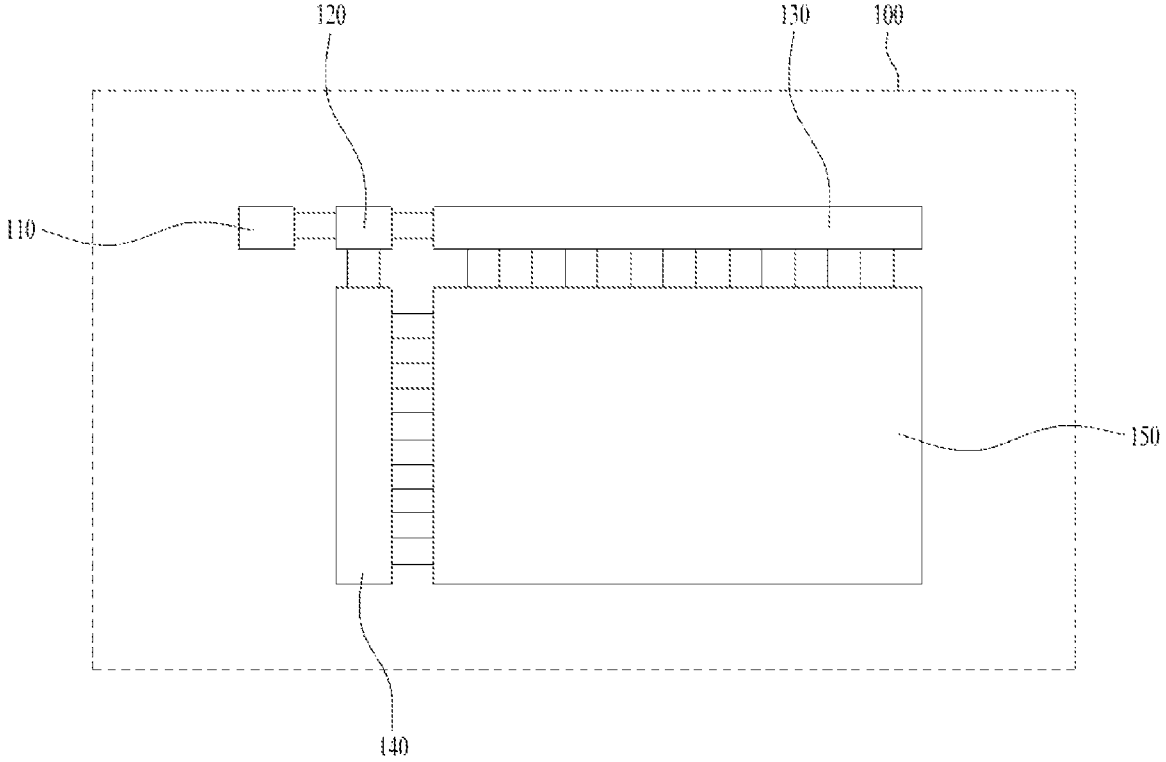
FIG. 1 is a configuration diagram of a display device according to an embodiment of the present disclosure.

Hereinafter, an embodiment disclosed in the present specification will be described in detail with reference to the accompanying drawings. Regardless of the drawings, the same or similar components are assigned the same reference numerals, and duplicated descriptions thereof will be omitted. The suffixes "module" and "unit" for the components used in the following description are given or mixed in consideration of only the ease of writing of the specification, and do not have distinct meanings or roles by themselves. In addition, in describing the embodiment disclosed herein, when it is determined that a detailed description of a related known technology may obscure the gist of the embodiment disclosed herein, the detailed description thereof will be omitted. In addition, the accompanying drawings are only for easy understanding of the embodiment disclosed herein, and it should be understood that the technical idea disclosed herein is not limited by the accompanying drawings, and includes all changes, equivalents or substitutes included in the spirit and scope of the present disclosure.

It should be appreciated that following embodiments of the present disclosure are only intended to embody the present disclosure and do not restrict or limit the scope of the right of the present disclosure. What an expert in the technical field to which the present disclosure belongs may easily derive from the detailed description and the embodiments of the present disclosure is interpreted as belonging to the scope of the right of the present disclosure.

The detailed descriptions should not be construed as restrictive in all respects, but rather should be construed as illustrative. The scope of the present disclosure should be determined by a reasonable interpretation of the appended claims, and any changes within the equivalent scope of the present disclosure are included in the scope of the present disclosure.

A display device described in the present disclosure may include a mobile phone, a smart phone, a laptop computer, a digital broadcasting terminal, PDA (personal digital assistant), PMP (portable multimedia player), navigation, Slate PC, Tablet PC, Ultra Book, digital TV, desktop computer and the like. However, it will be readily apparent to those skilled in the art that a configuration according to the embodiment described herein may be applied to a device capable of displaying an image which will be a new product to be developed later.

Further, in the present specification, a frequency and a signal are expressed so as to be distinguished from each other. For example, only an input image signal or a driving image signal as periodically repeated may be expressed as an input frequency or a driving frequency. However, even when signals other than the input image signal or the driving image signal are periodically repeated over time, the signals are simply expressed as signals.

FIG. 1 is a configuration diagram of a display device according to an embodiment of the present disclosure.

Referring to FIG. 1, a display device 100 to which embodiments are applied may include a processor 110 that converts an image of the input frequency into an image of the driving frequency, a timing controller 120 that controls the driving frequency to transmit an image signal to a display 150 via a driver, a data driver 130 connected to a plurality of data lines, and a gate driver 140 connected to a plurality of gate lines, and a display 150 in which the plurality of data lines and the plurality of gate lines intersect each other in a matrix form, and pixels are defined at intersection points.

The timing controller 120 starts scanning according to a timing implemented in each frame, and converts the image of the driving frequency received from the processor 110 according to a data signal format used by the data driver 130, and outputs the converted image data and controls data operation at an appropriate time according to the scan.

The timing controller 120 and the processor 110 may be embodied as one integrated circuit or may be implemented as separate components.

The data driver 130 drives a plurality of data lines by supplying a data voltage to the plurality of data lines. In this connection, the data driver 130 is also referred to as a source driver.

The data driver 130 may include at least one data driver IC to drive the plurality of data lines.

Each data driver IC may include a shift register, a latch circuit, a digital-to-analog converter (DAC), an output buffer, and, etc.

In some cases, each data driver IC may further include an analog-to-digital converter (ADC).

The gate driver 140 sequentially drives the plurality of gate lines by sequentially supplying a scan signal to the plurality of gate lines. In this connection, the gate driver is referred to as a scan driver.

The gate driver 140 may include at least one gate driver IC.

Each gate driver IC may include a shift register, a level shifter, and the like.

The gate driver 140 sequentially supplies a scan signal of an on voltage or an off voltage to the plurality of gate lines under the control of the timing controller 120.

When a specific gate line is opened by the gate driver 140, the data driver 130 converts the image data received from the timing controller 120 into an analog data voltage and supplies the analog data voltage to the plurality of data lines.

The data driver 130 may be located only at one side of the display device 100, for example, an upper side or a lower side thereof, as shown in FIG. 1 or may be located at both sides of the display device 100, for example, the upper side and the lower side thereof, according to a driving scheme, a panel design scheme, etc.

The gate driver 140 may be located only at one side of the display device 100, for example, a left or right side thereof, as shown in FIG. 1, or may be located at both sides of the display device 100, for example, the left and right sides thereof, according to the driving scheme, the panel design scheme, etc.

The above-described timing controller 120 receives, from the processor 110, input image data, and various timing signals including a vertical synchronization signal Vsync, a horizontal synchronization signal Hsync, an input data enable (DE) signal and a clock signal CLK.

For example, the timing controller 120 outputs various data control signals DCS including a data start pulse DSP, a data shift clock DSC, and a data output enable (DOE) signal to control the data driver 130.

In this connection, the data start pulse DSP controls an operation start timing of one or more data drivers IC constituting the data driver 130. The data shift clock DSC refers to a clock signal commonly input to one or more data drivers IC, and controls a shift timing of a scan signal (data pulse). The data output enable signal DOE specifies timing information of one or more data drivers 130.

Further, the timing controller 120 outputs various gate control signals GCS including a gate start pulse GSP, a gate shift clock GSC, a gate output enable signal GOE, etc. to control the gate driver 140.

In this connection, the gate start pulse GSP controls an operation start timing of one or more gate drivers IC constituting the gate driver 140. The gate shift clock GSC refers to a clock signal commonly input to one or more gate drivers IC and controls a shift timing of a scan signal (gate pulse). The gate output enable signal GOE specifies timing information of one or more gate drivers 140.

In this connection, the display 150 may include a display used in the display devices such as a liquid crystal display device (LCD), a plasma display device (PDP), an organic light emitting diode display device (OLED), and a micro light emitting diode display device (Micro-LED). Hereinafter, an example in which the display 150 is embodied as the organic light-emitting diode display will be described.

Each of sub-pixels of each of pixels (not shown) arranged on the display 150 is composed of an organic light-emitting diode as a self light-emitting element, and a circuit element such as a driving transistor to drive the organic light-emitting diode.

More specifically, the circuit element basically includes a data transistor connected to the data driver, a gate transistor connected to the gate driver, and a storage capacitor that maintains a data voltage corresponding to an image signal voltage or a voltage corresponding thereto for a predetermined time.

Further, a transistor receiving a separate control signal may be further included in the circuit element so that black data may be implemented according to a set time within one frame.

Figure 2:
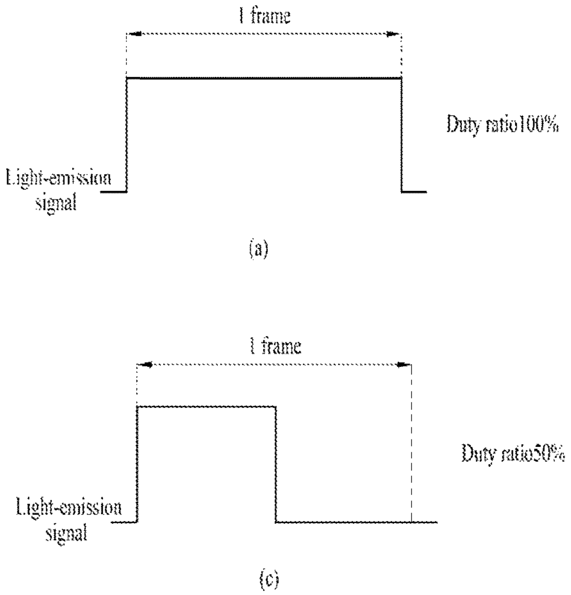
FIG. 2 is a waveform diagram of a light emission signal that may be transmitted to an individual pixel of a display via a timing controller of FIG. 1.

FIG. 2 is a waveform diagram of a light emission signal that may be transmitted to individual pixels of the display 150 through the timing controller 120 in FIG. 1.

The waveform diagram of the light emission signal in which the duty ratio varies within one frame as shown in FIG. 2 is a diagram to describe a scheme that has been recently introduced to a display device in order to overcome shortcomings of the conventional BFI (Black Frame Insertion) for inserting the black frame.

In the BFI for inserting the black frame, basically, original frames and black frames may be displayed alternately as odd number-th and even number-th frames. An entirety of a screen of the display 150 is maintained to be black at a timing when the black frame is inserted. Thus, average luminance decreases while the plurality of frames are reproduced.

In order to solve the above problem, a scheme of setting the duty ratio of the light emission signal within one frame interval and controlling the light emission signal based on the set duty ratio has been newly introduced.

In order to control the duty ratio of the light emission signal within one frame, for example, it is necessary to control the light emission signal per each individual pixel.

To this end, generally, a separate transistor to control the light emission signal other than the existing data transistor or gate transistor is introduced. An additional control signal is transmitted from the timing controller 120 to the separate transistor.

The duty ratio indicates a percentage of an interval having a signal-on within a certain period. In the present disclosure, for example, the duty ratio means a ratio of a time duration for which the display 150 emits light relative to a time duration of one frame.

Further, the duty ratio may be set per each individual pixel. An entire area of the display 150 may be divided into sub-areas. The duty ratio of the light emission signal may be set per each sub-area.

Further, the ratio of the light emission signal may be set per each of all pixels included in the display 150 within one frame.

Assuming that all pixels included in the display 150 within one frame are defined as one area, (a) to (d) in FIG. 2 are waveform diagrams of a light emission signal that is controlled on one area and based on preset duty ratios.

For example, in (c) FIG. 2, the duty ratio in one frame interval is set to 50%. Thus, all pixels emit light for one half of one frame to display the input image, and do not emit light for the other half thereof to display a black image. In this way, the duty ratio may be achieved.

The above approach may be achieved by the processor 110 only controlling the light emission signal of the timing controller without creating a separate black frame. Thus, an effect corresponding to increase in the driving frequency may be achieved without changing the driving frequency, thereby improving the motion picture response time and improving the quality of the reproduced image.

Further, specific areas of the display 150 may be specified and thus the light emission signal may be controlled per each area within one frame, such that a black frame may be inserted or a black image may be displayed within one frame, thereby minimizing average degradation of luminance characteristics.

Figure 3:
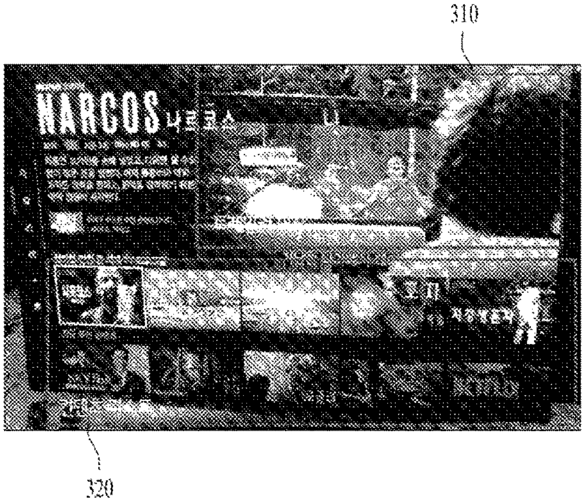
FIG. 3 is a diagram illustrating screen abnormality phenomenon that occurs when images of different driving frequencies are continuously reproduced.
Figure 3:
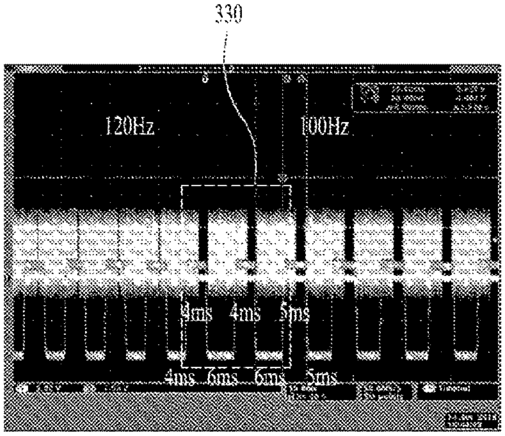

FIG. 3 is a diagram illustrating the screen abnormality phenomenon that occurs when images of different driving frequencies are continuously reproduced.

The display device to which the scheme for controlling the duty ratio of the light emission signal within one frame as described in FIG. 2 above is applied exhibit an excellent effect in terms of the motion picture response time or luminance, compared to the display device to which the black frame insertion technique (BFI) is applied. However, in the display device to which the scheme for controlling the duty ratio of the light emission signal within one frame as described in FIG. 2 above, when images of different driving frequencies are continuously reproduced, screen abnormality occurs for a period for which the change occurs.

In this connection, a general display device converts an input frequency of a newly input image into a driving frequency and only needs to control the driving frequency. However, the display device to which the scheme for setting the duty ratio is applied should control a separate light emission signal within one frame, which makes it difficult to temporarily control the changing frequency for the period for which the change occurs.

Further, an unexpected frequency change in the change period may lead to screen abnormality. Symptoms of the screen abnormality include tearing due to mismatch between an input vertical synchronization signal and an output vertical synchronization signal, stuttering due to a difference between frequencies of reproduced frames, or flicker phenomenon in which the screen brightness is not constant and the image is shaken.

(a) in FIG. 3 shows a screen where a selected image is being reproduced in a service screen that provides various motion pictures. In the service, a list of various motion picture contents 320 is displayed at a bottom of an entire screen. When one of the contents is selected, a trailer image 310 of the selected content is reproduced in a partial area of a top area of the entire screen as shown in (a) in FIG. 3. Thereafter, when the user selects another content, a trailer image of another content will be reproduced immediately. At this time, an unexpected frequency change occurs as shown in (b) in FIG. 3, and the change causes the screen abnormality phenomenon.

(b) in FIG. 3 is a screen, as captured by an oscilloscope, in which the frequency related abnormality occurs for a frequency change interval 330 when motion images of different driving frequencies are continuously reproduced without a buffer period.

The experiment of (b) in FIG. 3 was measured in a display device in which the duty ratio of the light emission signal within one frame was set to 50%. The duty ratio of 50% means that, for example, an on/off ratio of the light emission signal is 50%.

Therefore, when a first image with a driving frequency of 120 Hz is reproduced as shown in (b) in FIG. 3, the signal is repeatedly turned on and off while on duration is about 4 ms. When a second image with a driving frequency of 100 Hz is reproduced, the signal is repeatedly turned on and off while on duration is about 5 ms. However, regarding to the frequency of the signal for the change interval 330, on signal duration is 4 ms and an off signal duration is 6 ms, thus resulting in an unintended frequency change. Such frequency change causes the screen abnormalities such as flicker.

Figure 4:
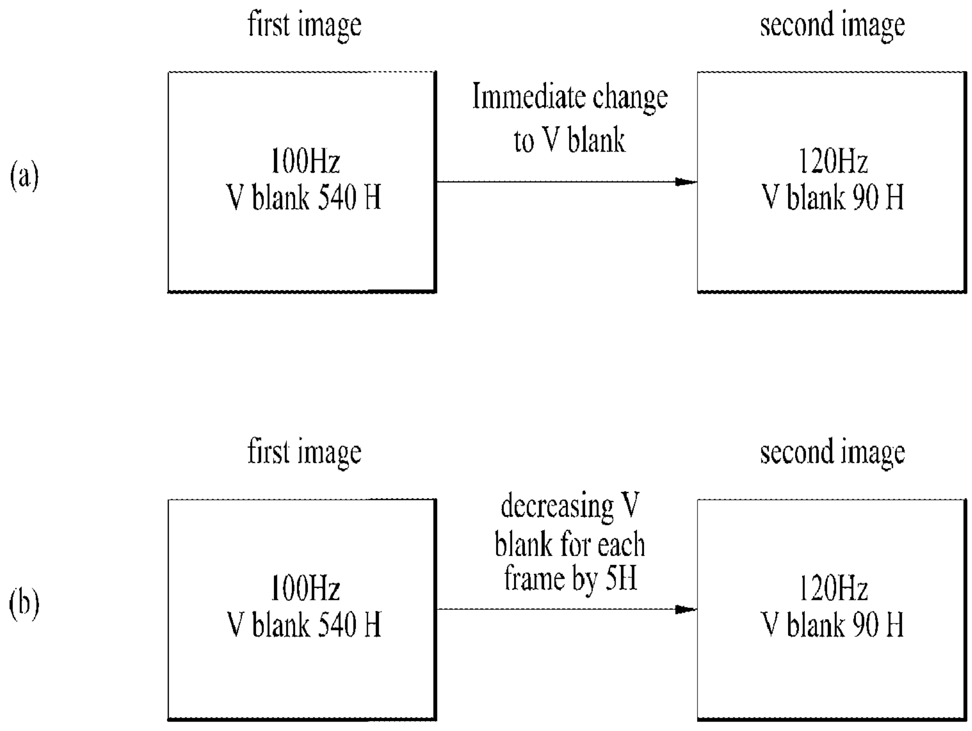
FIG. 4 is a view for illustrating a process in which a value of a vertical blank interval changes when images of different driving frequencies are continuously reproduced, according to each of a prior art and an embodiment of the present disclosure.

FIG. 4 is a diagram for illustrating a process in which a value of a vertical blank interval varies when images of different driving frequencies are continuously reproduced, according to each of the prior art and an embodiment of the present disclosure.

(a) in FIG. 4 is a view for illustrating a process in which the value of the vertical blank interval varies when images of different driving frequencies are continuously reproduced in the prior art.

The vertical blank interval refers to an interval between a timing at which a vertical scan signal to implement an image of one frame on the display is outputted and a timing at which a vertical scan signal to implement an image of a next frame on the display is outputted. In this connection, a synchronization signal is usually inserted thereto to achieve synchronization of the vertical scan signal and the horizontal scan signal.

In general, the vertical blank interval value is set based on the driving frequency. When the driving frequency is 100 Hz, the value is 540H. When the driving frequency is 120 Hz, the value is 90H.

H which denotes the value of the vertical blank interval has a temporal meaning and refers to a unit related to a signal scanned in horizontal and vertical directions to implement an image of one frame.

As shown in (a) in FIG. 4, in the prior art, when a first image of 100 Hz is changed to a second image of 120 Hz, the value of the vertical blank interval is immediately changed from 540H to 90H. Due to this immediate change of the vertical blank interval value, it is difficult for the display to have a separate buffer period while the first image is charged to the second image, thus making it difficult to solve the screen abnormality problem due to the frequency change.

(b) in FIG. 4 is a diagram illustrating a process of changing the value of the vertical blank interval when images of different driving frequencies are continuously reproduced in accordance with the present disclosure.

The sudden change in the driving frequency causes the screen abnormality. For this reason, in accordance with the present disclosure, when changing from the first image to the second image, for example, the display device may gradually change the value of the vertical blank interval per each frame and thus create a buffer period in the process of changing from the first image to the second image, such that the screen abnormality due to the frequency change may be minimized.

For the vertical blank interval, no image is output. The approach of creating the buffer period by gradually changing the value of the vertical blank interval is much simpler and achieves the effect more immediately than an approach of devising a separate complex signal processing technique using the processor is and does.

Figure 5:
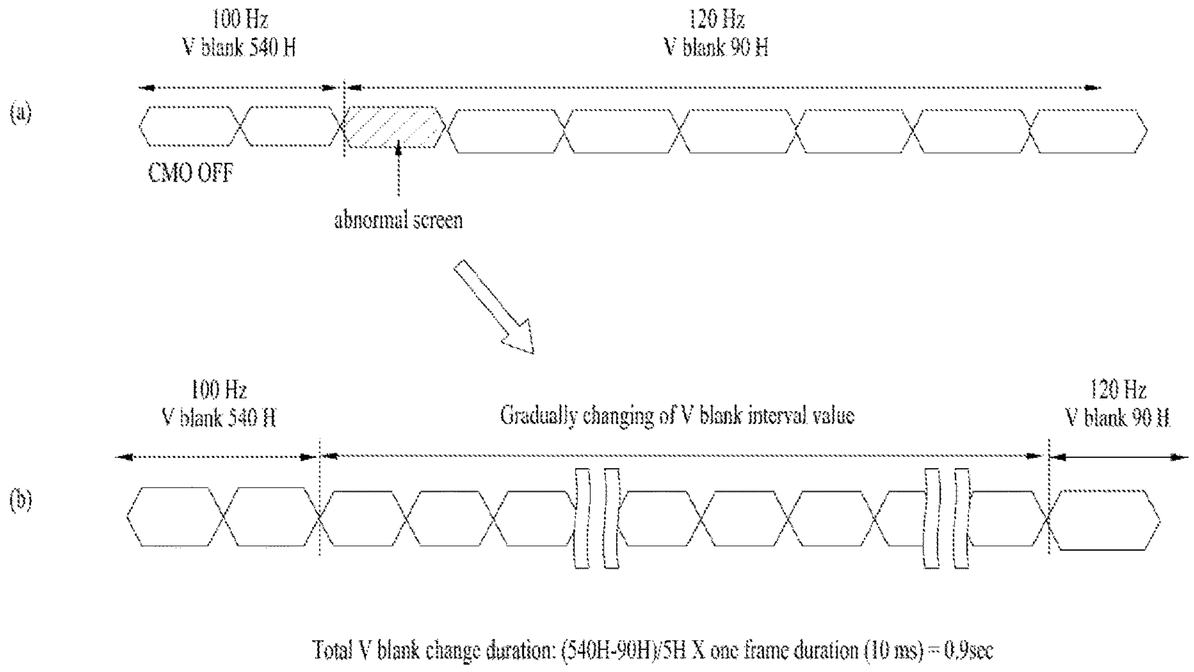
FIG. 5 is a diagram illustrating in detail a process in which a value of a vertical blank interval changes according to an embodiment of the present disclosure.

FIG. 5 is a diagram illustrating in detail the process of changing the value of the vertical blank interval according to an embodiment of the present disclosure.

(a) in FIG. 5 shows the screen abnormality that appears immediately for the change interval when the driving frequency of 100 Hz is changed to the driving frequency of 120 Hz in the display device to which the approach of the present disclosure is not applied.

(b) in FIG. 5 shows the process of gradually changing the value of the vertical blank interval when the driving frequency of 100 Hz is changed to the driving frequency of 120 Hz.

The value of the vertical blank interval set at the driving frequency of 100 Hz is 540H, and the value of the vertical blank interval set at the driving frequency of 120 Hz is 90H. A difference between the values of the vertical blank intervals is calculated. The value of the vertical blank interval per each frame gradually varies by a constant amount for the change period.

For example, as shown in (b) in FIG. 5, the process of gradually changing the value of the vertical blank interval from 540H to 90H is performed such that the value of vertical blank interval gradually decreases by a constant amount of 5H.

Therefore, as the frame changes, the vertical blank interval value changes from 540H, to 535H, to 530H, to 525H, . . . , to 90H. This change continues over a total of 90 frames. At the driving frequency of 120 Hz, a time duration of each frame is 10 ms. Thus, as shown in (b) in FIG. 5, the process of gradually changing the value of the vertical blank interval from 540H to 90H takes a total of 0.9 seconds.

FIG. 6 is a diagram showing information on a vertical scan interval and a horizontal scan interval set according to the driving frequency.

As shown in FIG. 6, it may be identified based on a value of the vertical scan interval during which an image is reproduced within one frame, a value of the vertical blank interval where the image is not reproduced, and a value of the total vertical scan interval that a difference between the values of the total vertical scan intervals due to the difference between driving frequencies may be considered to be due to the difference between the values of the vertical blank intervals.

For example, when the driving frequency is changed from 100 Hz to 120 Hz, a lager number of frames must be reproduced within the same time duration, and thus a reproduction time of one frame must be shortened. In this connection, when the value of the value of the vertical blank interval decreases, the reproduction time may be reduced.

However, in the display device 100, for example, when a signal playing a separate role such as the vertical synchronization signal uses the vertical blank interval, a sudden change in the driving frequency and the corresponding change in the vertical blank interval value may cause the processor not to control the signal stably. This may lead to the screen abnormalities such as flicker.

FIG. 7 is a diagram showing a ratio of a value of a vertical blank interval relative to a total vertical scan time within one frame and a difference between the ratios for adjacent frames when an amount by which the value of the vertical blank interval changes on a frame basis varies.

In (a) in FIG. 7, when the vertical blank interval value changes by an amount of 5H per each frame, the ratio of the vertical blank interval value relative to the total vertical scan time within one frame and a difference between the ratios for adjacent frames.

As the frame changes, the difference between the ratios for adjacent frames is 0.22%.

In (b) in FIG. 7, when the vertical blank interval value changes by an amount of 10H per each frame, the ratio of the vertical blank interval value relative to the total vertical scan time within one frame and a difference between the ratios for adjacent frames. As the frame changes, the difference between the ratios for adjacent frames is 0.44%.

In (c) in FIG. 7, when the vertical blank interval value changes by an amount of 20H per each frame, the ratio of the vertical blank interval value relative to the total vertical scan time within one frame and a difference between the ratios for adjacent frames. As the frame changes, the difference between the ratios for adjacent frames is 0.89%.

It was identified based on the result of the experiment of the device display to which the scheme of controlling the duty ratio of the light emission signal within one frame was applied under the conditions (a), (b), and (c) of the FIG. 7, that the flicker phenomenon was not observed under the conditions (a) and (b) of the FIG. 7 while the flicker phenomenon was observed in the condition (c) of FIG. 7.

That is, the larger the amount by which the vertical blank interval value per each frame changes, the higher the probability of occurrence of the screen abnormalities such as flicker for the period for which the image of the driving frequency changes.

Therefore, the smaller the amount by which the vertical blank interval value per each frame changes, the lower the probability of occurrence of the screen abnormalities such as flicker for the period for which the image of the driving frequency changes. However, in this case, a larger number of frames are required before the value of the vertical blank interval reaches a last value, and accordingly, a time required to change the vertical blank interval becomes larger. For this reason, the amount by which the vertical blank interval value per each frame changes should be adjusted to an appropriate value.

FIG. 8 is a diagram of the vertical blank interval value that changes on a frame basis, based on a difference between the input frequency and the driving frequency when the input frequency is converted to the driving frequency.

As shown in FIG. 8, a second input frequency is converted to a second driving frequency. For example, the input frequency may be 24 Hz, 25 Hz, 50 Hz or 60 Hz, and the converted driving frequency may be 100 Hz or 120 Hz.

Unlike the first driving frequency, the second driving frequency is designed so that the value of the vertical blank interval per each frame gradually changes by the same amount.

In (a) in FIG. 8, an input frequency of 25 Hz is converted to a driving frequency of 100 Hz. For 25 Hz of the input frequency, 25 frames are reproduced per second. Thus, for a driving frequency of 100 Hz, the 25 frames are converted into 100 frames.

In the conversion process, the same frame may be repeated four times in succession. Even when the difference between the values of the vertical blank intervals for the temporally adjacent frames is set to be relatively larger, the probability of the occurrence of screen abnormality is reduced for a period in which the same frame is continuously reproduced.

In (b) in FIG. 8, an input frequency of 24 Hz is converted to a driving frequency of 120 Hz. In the conversion process, the same frame may be repeated five times in succession. The difference between the values of the vertical blank intervals for the temporally adjacent frames may be set to be relatively larger.

However, in (c) in FIG. 8, an input frequency of 50 Hz is converted to a driving frequency of 100 Hz. In the conversion process, the same frame may be repeated two times in succession. The difference between the values of the vertical blank intervals for the temporally adjacent frames should be set to be relatively smaller.

Further, in (d) in FIG. 8, an input frequency of 60 Hz is converted to a driving frequency of 120 Hz. In the conversion process, the same frame may be repeated two times in succession. The difference between the values of the vertical blank intervals for the temporally adjacent frames should be set to be relatively smaller, compared to (a) in FIG. 8 or (b) in FIG. 8.

Relatively setting the difference between the values of the vertical blank intervals for the temporally adjacent frames may mean, for example, setting a difference between specific input and driving frequencies as a reference value, and when the difference between the frequencies is larger than the reference value, setting the difference between the values of the vertical blank intervals to be larger and, when the difference between the frequencies is smaller than the reference value, setting the difference between the values of the vertical blank intervals to be smaller.

Further, relatively setting the difference between the vertical blank interval values for the temporally adjacent frames may be performed based on the number of repetitions of the same frame. When converting from the input frequency to the driving frequency, the number of repetitions of the same frame will vary based on the difference between the driving frequency and the input frequency. As the number of repetitions of the same frame increases, the difference between the vertical blank interval values for the temporally adjacent frames may be set to be relatively larger.

In the frequency conversion as shown in FIG. 8, the difference between the input frequency and the driving frequency has an integer multiple. However, the disclosure is not limited thereto. Even when the difference is not an integer multiple, the number of duplicated frames may be appropriately adjusted, and then the difference between the vertical blank interval values for the temporally adjacent frames may be set based on the number.

For example, when an input frequency of 40 Hz is converted to a driving frequency of 100 Hz, two different frames may be repeated at a ratio of 2:3. The frame reproduced at 40 Hz is divided into odd and even frames. In the conversion thereof into 100 Hz, the same odd-numbered frame is repeated twice, and the even-numbered frame is repeated three times.

In this way, when the image of the input frequency is converted to the image of the driving frequency, the amount by which the vertical blank interval changes on the frame basis may be adjusted based on the frequency difference or the number of times by which the same frame is repeated, thereby minimizing the screen abnormality that occurs when images of different driving frequencies are continuously reproduced.

Figure 9:
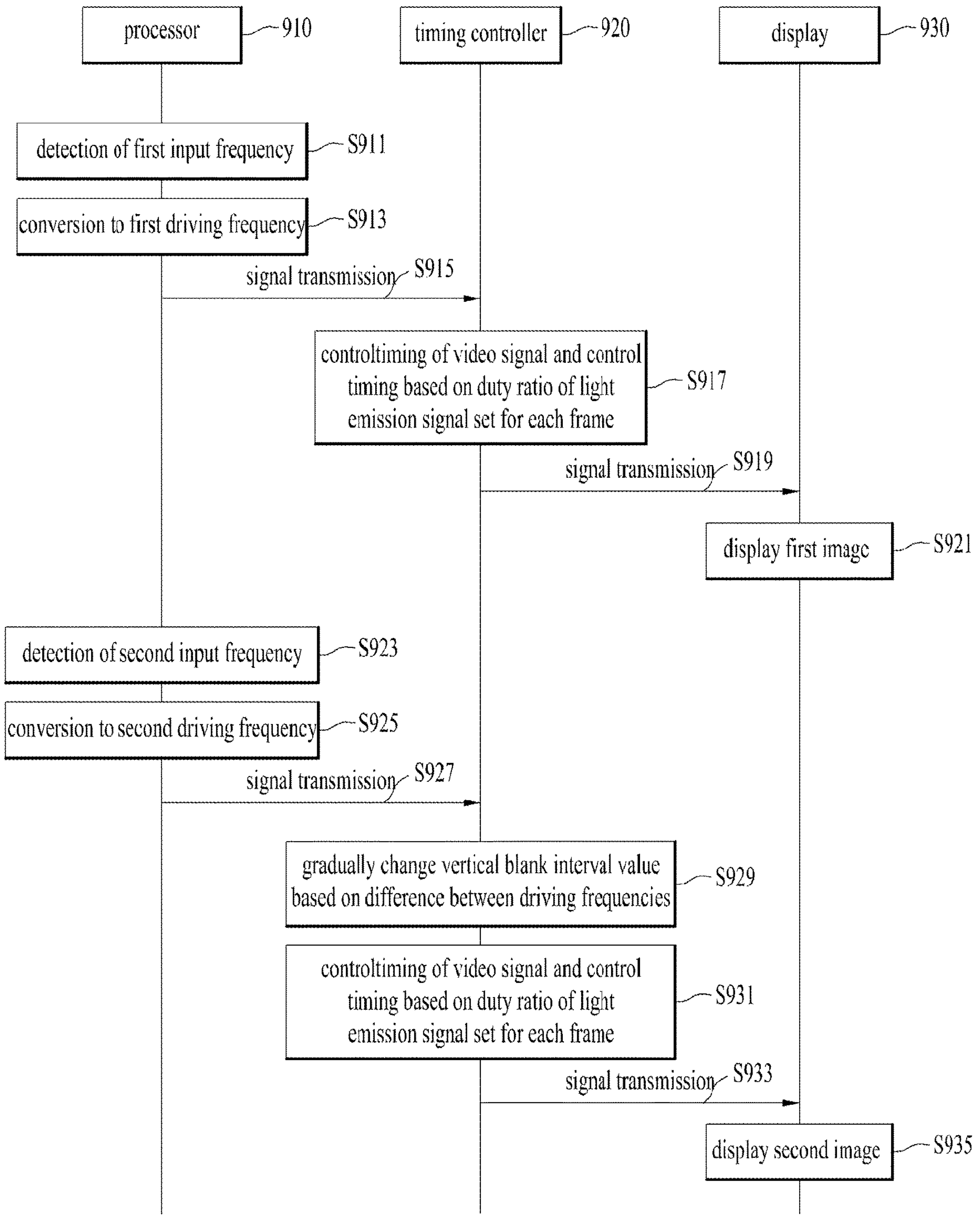
FIG. 9 is a flowchart of a method for controlling a display device according to an embodiment of the present disclosure.

FIG. 9 is a flowchart of a method for controlling a display device according to an embodiment of the present disclosure.

First, the processor 910 detects the first input frequency in S911 and converts the same to the first driving frequency in S913. In this connection, as described above, the frequency conversion does not simply mean an increase or decrease in Hz, but may mean a concept including a frame replication ratio based on the frequency difference and, further, signal processing for image quality improvement.

The converted first driving frequency is transmitted to the timing controller 920 in S915. The timing controller 920 outputs the control signals for adjusting a timing of the video signal corresponding to the first driving frequency and a timing based on the duty ratio of the light emission signal set for each frame in S917.

The display 930 will display the first image based on the control signals received (S919) from the timing controller 92 in S921.

When the processor 910 detects the second input frequency used for reproducing the second image while the first image is being displayed in S923, the processor 910 converts the second input frequency to the second driving frequency in S925.

Afterwards, the converted second driving frequency is transmitted to the timing controller 920 in S927. When the first driving frequency and the second driving frequency are different from each other, the timing controller controls the vertical blank interval value so as to be gradually changed on a frame basis by the constant amount in S929.

The timing controller 920 may determine the constant amount corresponding to the change in the frequency when converting from the second input frequency to the second driving frequency. The process of determining the constant amount may be pre-performed by the processor 910.

Further, the timing controller 920 outputs control signals for adjusting the timing of the video signal corresponding to the second driving frequency and the timing based on the duty ratio of the light emission signal set for each frame in S931.

Finally, the display 930 will display the second image based on the control signals received (S933) from the timing controller 92 in S935.

Figure 10:
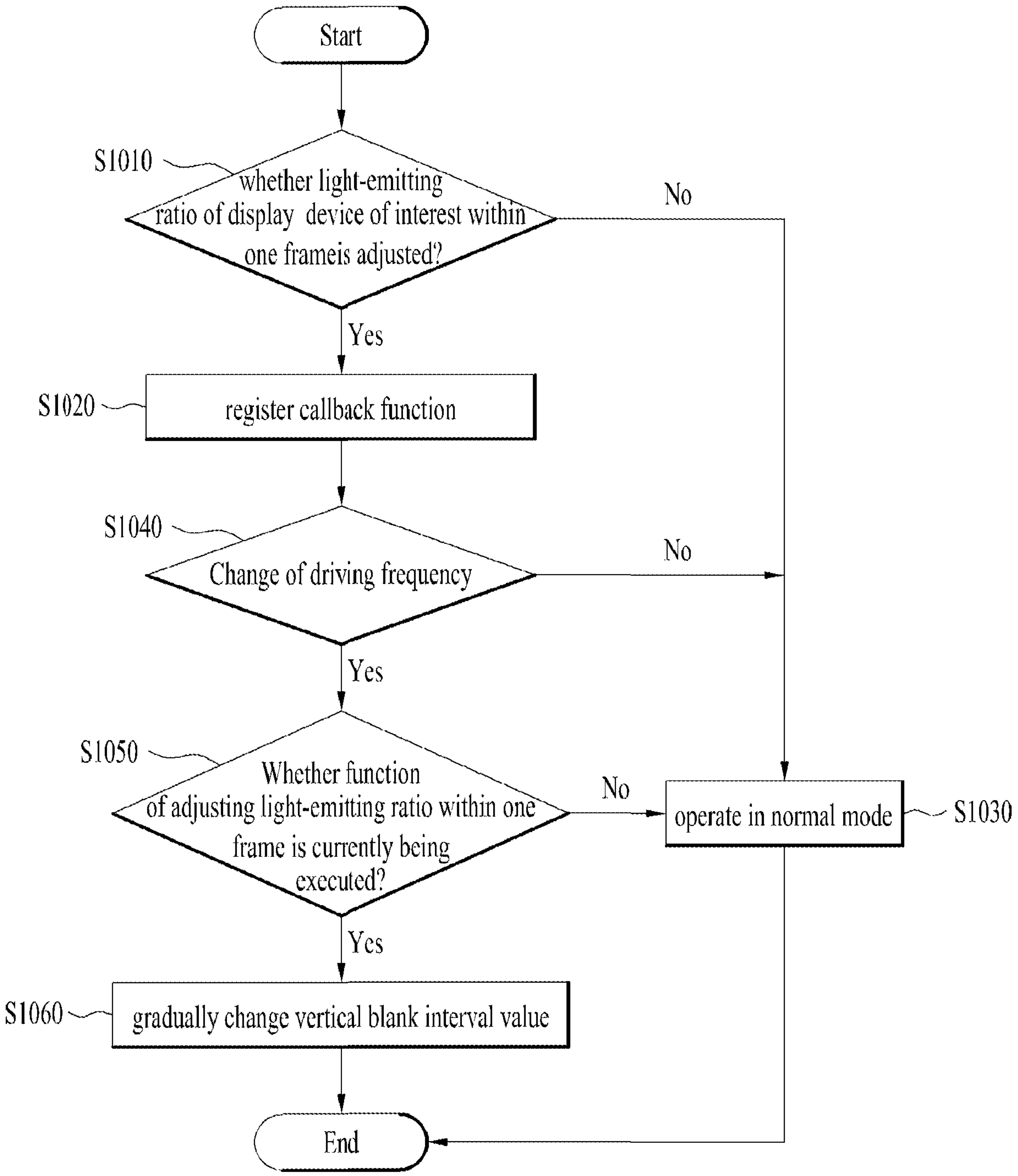
FIG. 10 is a flowchart of a process of changing a value of a vertical blank interval according to an embodiment of the present disclosure.

FIG. 10 is a flowchart of a process of changing the value of the vertical blank interval according to an embodiment of the present disclosure.

The scheme of changing the value of the vertical blank interval according to the present disclosure is more effective in a display device that may control the light emission ratio within one frame. Thus, first, the processor determines whether a display device of interest is a display device whose light-emitting ratio within one frame is adjusted in S1010.

When the display device of interest is not the display device whose light-emitting ratio within one frame is controlled, a separate vertical blank time change is not applied to the device but the device is set to operate in a normal mode in S1030.

When the display device of interest is the display device whose light-emitting ratio within one frame is controlled, the processor registers a callback function S1020. When the image having the changed driving frequency is reproduced, the callback function is executed.

Subsequently, the process checks whether the driving frequency has been changed in S1040. When the driving frequency has not been changed, the device is set to operate in the normal mode in S1030.

When the driving frequency has been changed, it is checked whether a function of adjusting the light-emitting ratio within one frame in the display device is currently being executed in S1050.

When the above function is disabled, the device may be set to operate in the normal mode in S1030. When the function is enabled, the value of the vertical blank interval is gradually changed while the image of the changed driving frequency is reproduced in S1060.

In FIG. 10, all of the series of steps including S1020 of registering the callback function and S1060 of gradually changing the value of the vertical blank interval are shown in order. For example, S1060 of gradually changing the value of the vertical blank interval is separately performed whenever the event in which the driving frequency has changed (S1040) occurs.

Although the present disclosure has been described with reference to the accompanying drawings, the drawings are only the embodiments and the disclosure is not limited to the embodiments, and the disclosure may be modified by a person skilled in the art in the field to which the present disclosure belongs. The modifications belong to the scope of rights based on Claims. Further, such variant implementations should not be understood separately from the technical spirit of the present disclosure.

The invention claimed is:

1. A method for controlling a display device, wherein the display device includes a display including a plurality of pixels, and each of the plurality of pixels include an organic light emitting diode, the method comprising:

converting a first input frequency to a first driving frequency;

when the device operates at the first driving frequency, controlling a light emission signal based on a value of a first vertical blank interval set for the first driving frequency regardless of a time point;

converting a second input frequency different from the first input frequency into a second driving frequency;

when a function of adjusting a light-emitting ratio within one frame in the display is executed for operating at the second driving frequency, controlling, at a first time point, the signal based on a value of a third vertical blank interval, which is different from the value of the first vertical blank interval set for the first driving frequency and a value of a second vertical blank interval set for the second driving frequency;

sequentially changing the value of the third vertical blank interval by a constant amount based on a number of repetitions of a same frame to be displayed on the display; and at a second time point after the first time point, controlling the signal based on the value of the second vertical blank interval set for the second driving frequency.

2. The method of claim 1, wherein the sequentially changing includes gradually changing the value of the third vertical blank interval.

3. The method of claim 2, wherein the value of the third vertical blank interval is between the value of the first vertical blank interval set for the first driving frequency and the value of the second vertical blank interval set for the second driving frequency.

4. The method of claim 3, wherein the method comprises, when converting the second input frequency to the second driving frequency, determining the constant amount based on a difference between the second input frequency and the second driving frequency.

5. The method of claim 1, wherein one of the first driving frequency and the second driving frequency is 100 Hz and the other thereof is 120 Hz.

6. A display device comprising:

a processor;

a display including a plurality of pixels, wherein each of the plurality of pixels include an organic light emitting diode; and a timing controller configured to temporally control a driving frequency to operate the display, wherein the timing controller is configured to:

display an image of a first input frequency on the display; and when a function of adjusting a light-emitting ratio within one frame in the display is executed, gradually change a value of a vertical blank interval, by a constant amount, for each frame interval for displaying an image of a second input frequency, wherein the value of the vertical blank interval is based on a number of repetitions of a same frame to be displayed on the display.

7. The device of claim 6, wherein the processor is configured to convert the image of the first input frequency into the image of a first driving frequency, and convert the image of the second input frequency into an image of a second driving frequency.

8. The device of claim 7, wherein the timing controller is configured to change sequentially the value of the vertical blank interval by the constant amount, which is between a value of a first vertical blank interval set for the first driving frequency and a value of a second vertical blank interval set for the second driving frequency.

9. The device of claim 8, wherein when converting the second input frequency to the second driving frequency, the timing controller is configured to determine the constant amount based on a difference between the second input frequency and the second driving frequency.

10. The device of claim 7, wherein the first driving frequency or the second driving frequency is 100 Hz or 120 Hz.

11. A method for controlling a display device, the method comprising:

converting a first input frequency to a first driving frequency;

based on the device operating at the first driving frequency, controlling a light emission signal based on a value of a first vertical blank interval set for the first driving frequency regardless of a time point;

converting a second input frequency different from the first input frequency into a second driving frequency;

based on a function of adjusting a light-emitting ratio within one frame in the display being executed for operating at the second driving frequency, controlling, at a first time point, the signal based on a value of a third vertical blank interval, which is different from the value of the first vertical blank interval set for the first driving frequency and a value of a second vertical blank interval set for the second driving frequency;

sequentially changing the value of the third vertical blank interval by a constant amount based on a number of repetitions of a same frame to be displayed on the display; and at a second time point after the first time point, controlling the signal based on the value of the second vertical blank interval set for the second driving frequency.

* * * * *